July 2, 1968   N. HUNTER   3,390,913
REMOVABLE VEHICLE BODY
Filed July 12, 1966   3 Sheets-Sheet 2
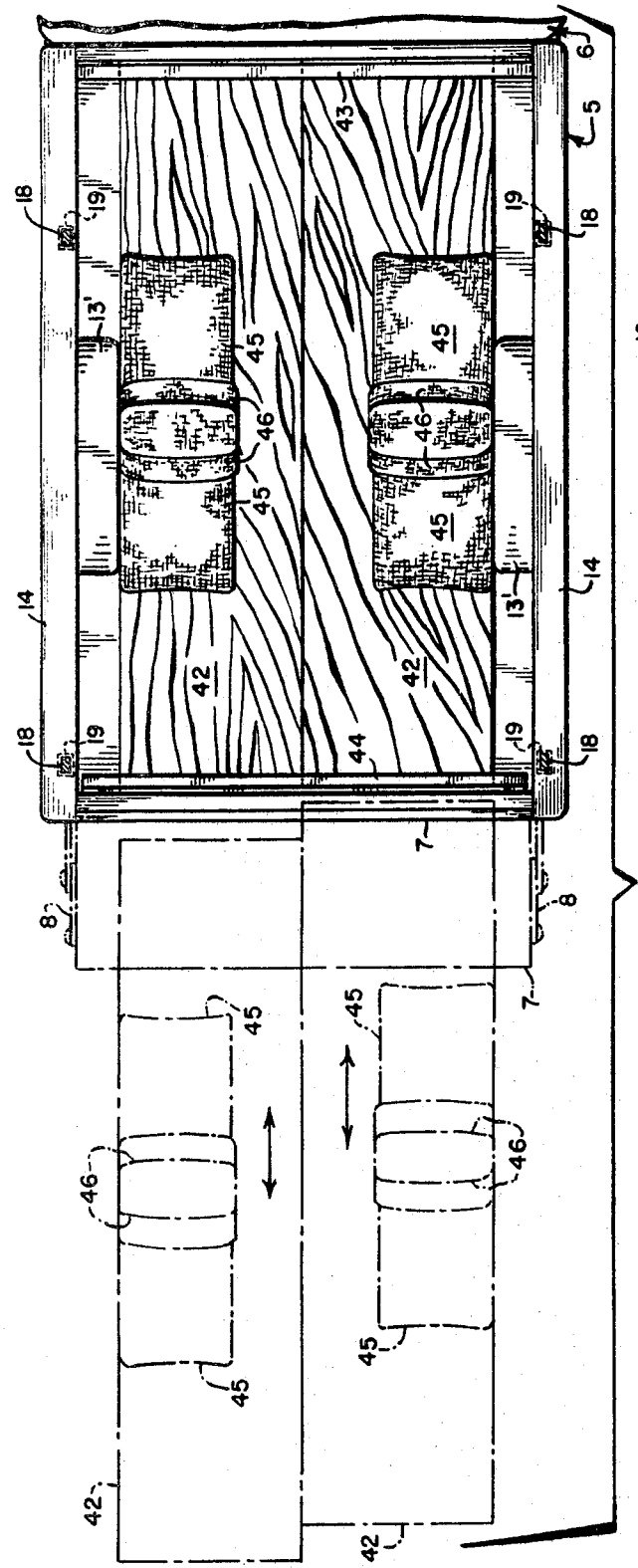
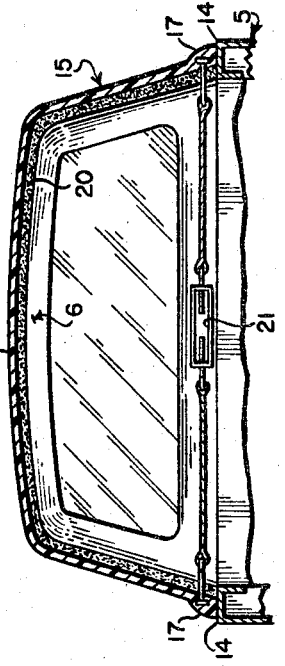
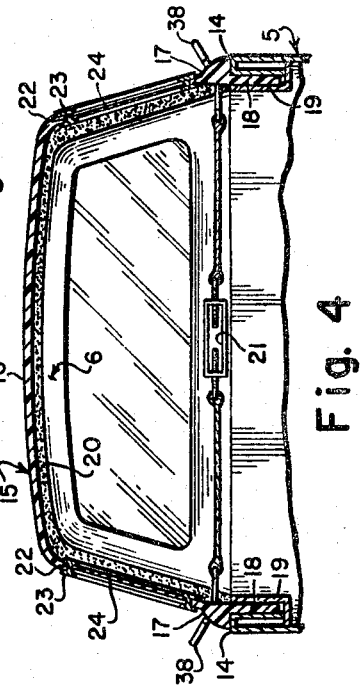
INVENTOR.
NATHANIEL HUNTER
BY James N. Cyles
ATTORNEY July 2, 1968 N. HUNTER 3,390,913
REMOVABLE VEHICLE BODY
Filed July 12, 1966 3 Sheets-Sheet 3

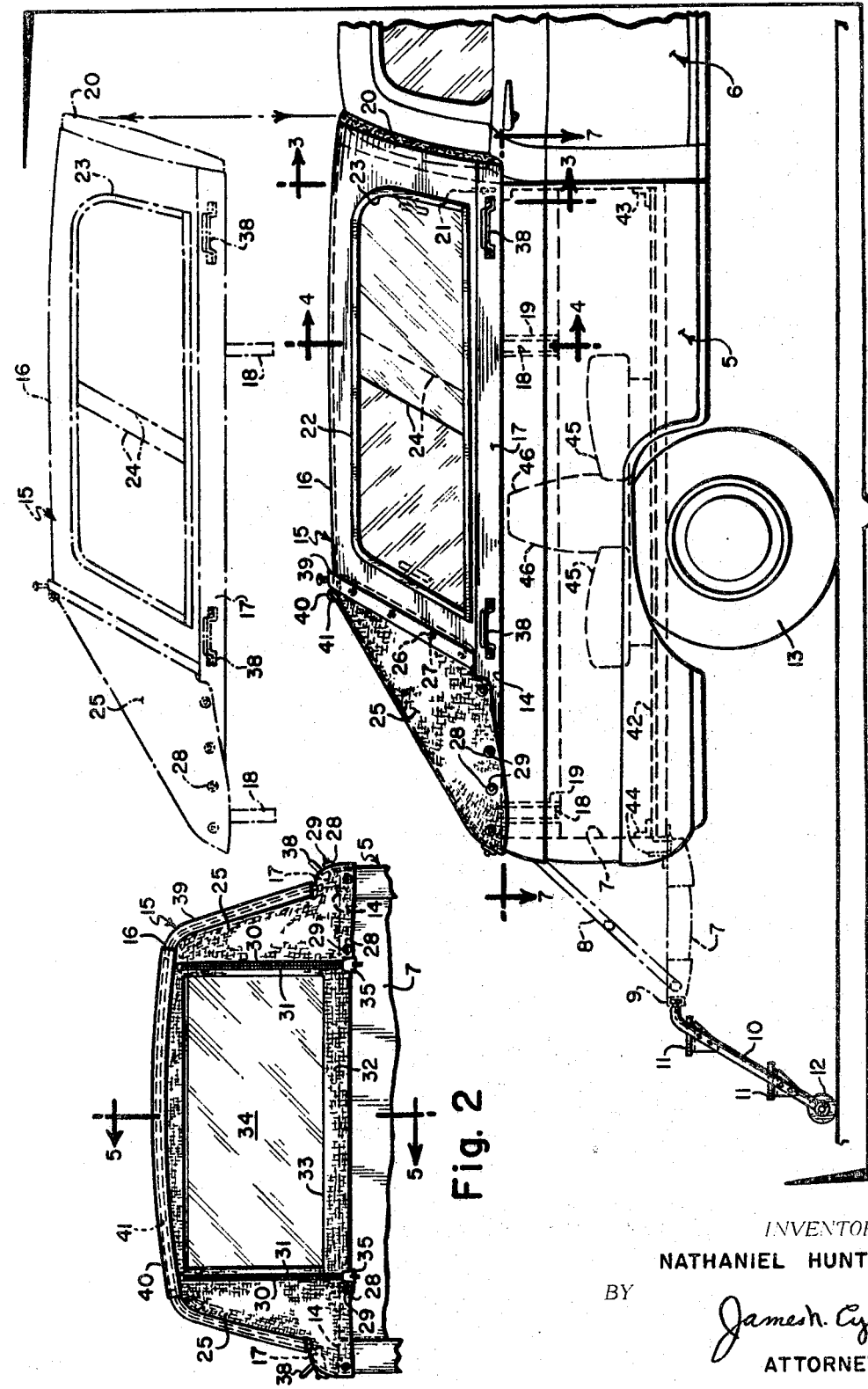

INVENTOR.
NATHANIEL HUNTER
BY James N. Cyles
ATTORNEY

3,390,913
REMOVABLE VEHICLE BODY
Nathaniel Hunter, 526 NW. 22nd Ave.,
Fort Lauderdale, Fla. 33311
Filed July 12, 1966, Ser. No. 564,649
4 Claims. (Cl. 296—10)

ABSTRACT OF THE DISCLOSURE

A truck body having an open load carrying portion with side walls is provided with a top or closure to convert the load carrying portion to a passenger carrying space. The top has side panels with windows and a rear closure with wings and a rollable panel that may be rolled up to provide access to the inside of the top. Seats are slidable in and out of the load carrying portion.

---

This invention relates to a detachable body enclosure for a conventional pickup truck, whereby to convert the cargo body of the conventional pickup truck to a passenger carrying housing similar to the well-known station wagon.

The invention contemplates a molded body portion, adapted to seat upon the marginal edges of the truck body and to overlie the cab of the truck to form a substantially water tight connection and with the sides of the device being provided with sliding type windows and passenger seats that are fixed to boards that slide into and out of the truck body.

A further object of the invention is to provide a rear closure for the convertible body that is connected at each side by conventional snap fasteners, and with the rear closure being formed of flexible material whereby wing portions extend inwardly and are connected to a center panel, that is formed of a flexible frame carrying a sheet of clear plastic and with the panel being connected to the wings by slide fasteners that are operable from either the inside or outside of the body and, when the slides are shifted upwardly, to permit the panel to be rolled upwardly and fastened to a point adjacent the roof.

The invention further contemplates a closure for a pickup truck that is bodily removable to expose the truck cargo body and readily reinstalled upon the truck body and held against shifting.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

In the drawings:

FIGURE 1 is a side elevational view of a pickup truck body having the invention applied thereto and with the invention also being shown in dotted lines as being removed from the truck body, FIGURE 2 is a rear end elevational view of the structure shown in FIGURE 1, with the truck body and ground wheels being broken away.

FIGURE 3 is a transverse section taken substantially on line 3—3 of FIGURE 1,

FIGURE 4 is a transverse section taken substantially on line 4—4 of FIGURE 1,

FIGURE 7 is a horizontal section taken substantially on line 7—7 of FIGURE 1.

Figures 5, 6, 8:
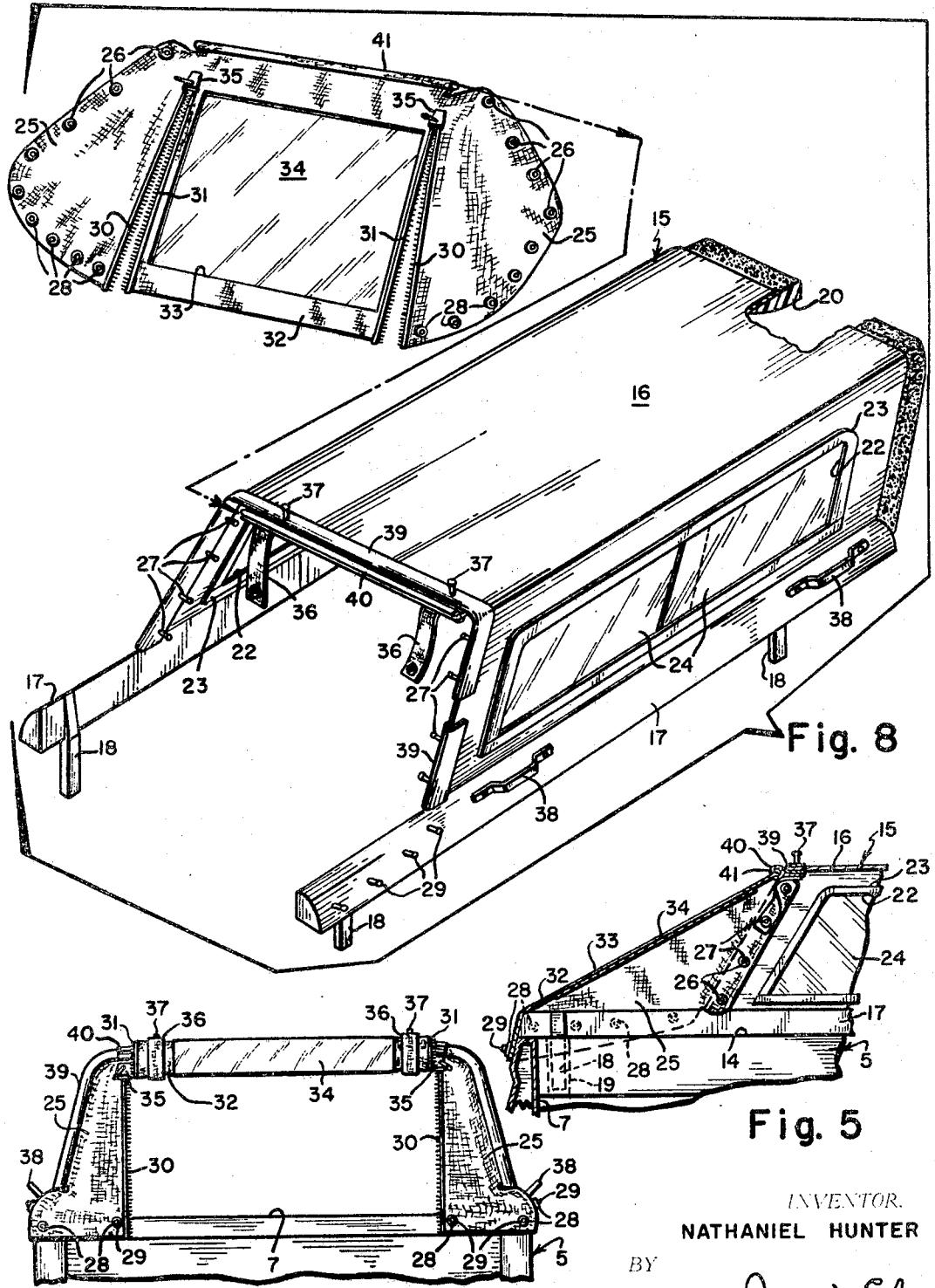
FIGURE 5 is a section taken substantially on line 5—5 of FIGURE 2.
FIGURE 6 is a view similar to FIGURE 2, but showing the rear panel in the rolled up position to permit access to the body of the truck.
FIGURE 8 is a perspective view of the housing and also including the wings and the rear panel and the mode of fastening the wings to the body of the canopy.

Referring specifically to the drawings, there has been illustrated a conventional pickup truck body 5, having a cab 6. The truck body 5 is provided with a tail-gate device 7, that is hinged to the body 5 in the usual and well known manner. In FIGURE 1, the tail-gate 7 is in the closed position and shown in dotted lines in the open or horizontal position. The tail-gate 7 is held in the open position by brace bars 8. Engaged within the normally upper edge of the tail-gate 7, in a socket 9, is a detachable ladder 10, having steps 11 and lower ground wheels 12. The body 5 is supported upon rear ground wheels 13, as is customary.

Adapted to be disposed over and upon the marginal edges 14 of the truck body, is a preferably molded canopy 15. The canopy 15 is arcuate upon its top 16 and flares outwardly toward the edges 14 of the truck body 5 and terminates in a bead 17, that seats upon the top of the marginal edges 14 and held against movement by stakes 18, that have fitment into sockets 19 that extend downwardly from the marginal edges 14 of the truck body. The forward end of the canopy 15 overlies the roof of the cab 6, shown particularly in FIGURES 1–4 and a cushion water-proof strip 20 is firmly held against the forward end of the canopy 15 and firmly compressed into water tight engagement with the roof of the cab, by a turn buckle 21, that is connected to the sides of the canopy 15 adjacent to the cab 6 and so that the canopy will not spread outwardly. The sides of the canopy 15 are provided with elongated openings 22, into which is fitted a metallic frame 23, forming trackways for sliding clear plastic panels 24.

Adapted to cover the rear end of the canopy 15, are end flexible wings 25, having a row of female snap fasteners 26, that engage male fasteners 27 upon the inner edge of the canopy while the row of female snap fasteners 28 engage the corresponding row of male snap fasteners 29 that project outwardly from the bead 17 of the canopy whereby the wings 25 are mounted to the edges of the canopy in a manner to avoid the entry of water or the like. One free edge of the wings 25 is provided with a slide fastener 30 that has mating engagement with the slide fastener 31 carried by a flexible fabric frame 32. The frame 32 is provided with an opening 33, that is covered by a clear plastic sheet 34, that is preferably stitched to the edges of the opening 33. Slidable fasteners 35, are operable from either the outside or the inside of the canopy and, when the fasteners are in the position shown in FIGURE 8, the frame 32 and the plastic sheet 34 may be rolled upwardly as shown in FIGURE 6 and retaining straps 36 engage snap fasteners 37, to maintain the roll in the upper position shown in FIGURE 6. The beads 17 are provided with spaced apart handles 38 whereby a person upon opposite sides of the truck may bodily lift the canopy from the truck and set it in any desirable place for temporary storage. The rear open end of the canopy is preferably reinforced by a molded or extruded strip 39, that is bonded by suitable cement to the exposed open end of the canopy and the extruded strip 39 carries a channeled extruded strip 40, receiving an enlarged slide bar at 41 whereby to hingedly support the rear closure panel, including the frame 32 and the plastic sheet 34.

Slidable upon the floor of the truck body, is a pair of elongated boards 42 that jointly cover the bottom of the truck with the forward edges of the boards 42 engaging beneath an angle iron 43 and with the boards being fully shoved into the truck body to engage their forward ends under the channel iron 3, the rear ends of the boards terminate beneath an angle iron 44, fixed to the tail-gate 7. Each of the boards 42 carry a pair of seats 45, that face in opposite directions and with the two seats 45 having but a single backrest 46.

In the use of the device, the canopy 15 is placed upon the tops and the sides of the truck body, with the stakes 18 being disposed within their respective sockets, shown particularly in FIGURE 4. The canopy 16 is thus positioned to permit the canopy top 16 to extend over the curved rear wall of the cab 6, with the cushion member 20 being compressed by the weight of the canopy to effectively prevent the entrance of water to the interior of the canopy. The turnbuckle 21 effectively prevents the entrance of water past the rubber gasket 20. The wings 25 remain fixed to the canopy by the snap fasteners 27 and 29 and carry the rear closure cover 34 either in the extended position or in the rolled up position of FIGURE 6 and permits ready access to the interior of the canopy, when the tail-gate 7 is in a horizontal position, with the ladder 10 connected thereto. If the boards carrying the seats 45 have been previously removed from the truck, it is apparent that they will be reinstalled, to lie against the wheel wells 13'. With the several parts assembled, the driver of the vehicle removes the ladder 10 and then closes the tail-gate 7, to the full line position of FIGURE 1 and the vehicle is now ready to be driven to the highway. When the truck is to be used for commercial hauling, the canopy is lifted from the opposite sides and seated into a suitable area to rest upon the stakes 18. The boards 42 are also removed, carrying the seats 45 and the pickup truck is now ready for use as a hauling medium in the usual and well known manner.

It will be apparent from the foregoing that a very novel form of canopy has been provided to be fitted upon the conventional pickup truck and to convert the truck body into a station wagon. The parts are few and simple, are strong, durable and cheap to manufacture.

It is to be understood that the invention is not limited to the precise construction shown, but that changes are contemplated as readily fall within the spirit of the invention as shall be determined by the scope of the subjoined claims.

I claim:

1. In combination with a truck body having a cab structure and a load carrying portion including side walls provided with stake sockets and a tail gate, a top having downwardly extending side panels having a frame at the bottom thereof provided with stakes entering said sockets to connect said top to said side walls, said top having a cushion edge at the forward end thereof conforming to said cab structure, means for pulling said side panels inwardly to compress said cushion edge to form a water tight connection between the top and the cab structure, flexible panels detachably connected to the rear edges of said side panels and to said frame, a rollable clear plastic panel that is connected to said flexible panels by a slidable connector and also to the top portion of said top, a plurality of seats affixed to a board that slides upon the bottom of said load carrying portion, and a ladder attachment for said tail gate.

2. The combination of claim 1 in which said side panels of said top have openings covered and uncovered by sliding transparent panels, and said flexible panels having a triangular shape and partially extending over the rear of said load carrying portion whereby said flexible panels and said plastic panel close the rear of the top.

3. The combination of claim 1 in which said top is formed of fiberglass except for said frame including said stakes which are of wood, said cushion edge comprises a sponge rubber member, said side panels being biased toward each other by a pair of wires and a turnbuckle, said frame having spaced apart handles whereby the entire top may be lifted from said load carrying portion, and said side panels having openings with trackways receiving transparent panels.

4. In combination with a truck body having a cab structure and a load carrying portion including side walls provided with stake sockets and a tail gate, a molded top of fiberglass having side panels provided with a frame at the base thereof, said frame having stakes fitting into said stake openings, a ladder attachment for said tail gate, a pair of boards resting on the bottom of said load carrying portion and extending the full length of said load carrying portion, angle irons carried respectively by said tail gate and said inner end of said load carrying portion with said boards fitting under said angle irons, seats fixed on said boards and facing in opposite directions, triangular flexible panels fixed to the rear top portion of said top and to said side panels and to said frame by separable fasteners, said flexible panels extending inwardly to partially close the rear of said top, a rollable clear plastic panel connected to the rear top portion of said top and also connected to said flexible panels by slidable fasteners, and means fixed to said frame to facilitate lifting the top from said load carrying portion, the seats and boards also being removable therefrom.

References Cited

UNITED STATES PATENTS

| | | | |
|---|---|---|---|
| 2,665,165 | 1/1954 | Pitman | 296—102 X |
| 2,903,042 | 9/1959 | Thornburg | 296—63 |
| 2,925,303 | 2/1960 | Lane | 296—102 |
| 3,167,349 | 1/1965 | Young et al. | 296—102 X |

BENJAMIN HERSH, *Primary Examiner.*

J. A. PEKAR, *Assistant Examiner.*